June 11, 1935.  A. M. REMINGTON  2,004,174
HEAT TREATMENT OF SAWS, ETC
Filed Dec. 30, 1931  2 Sheets-Sheet 1
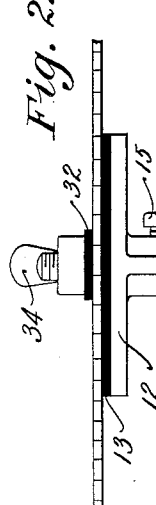
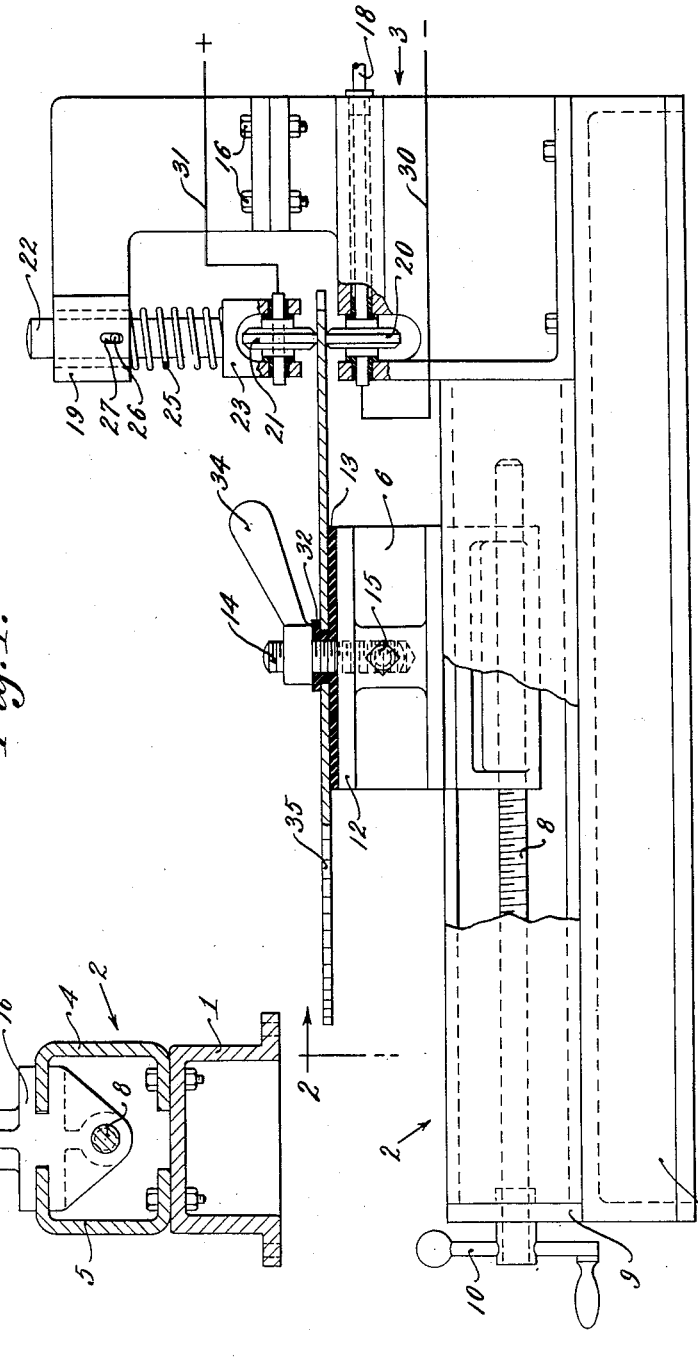
Inventor;
Alfred M. Remington,
by Roberts, Cushman & Woodberry
Attys.

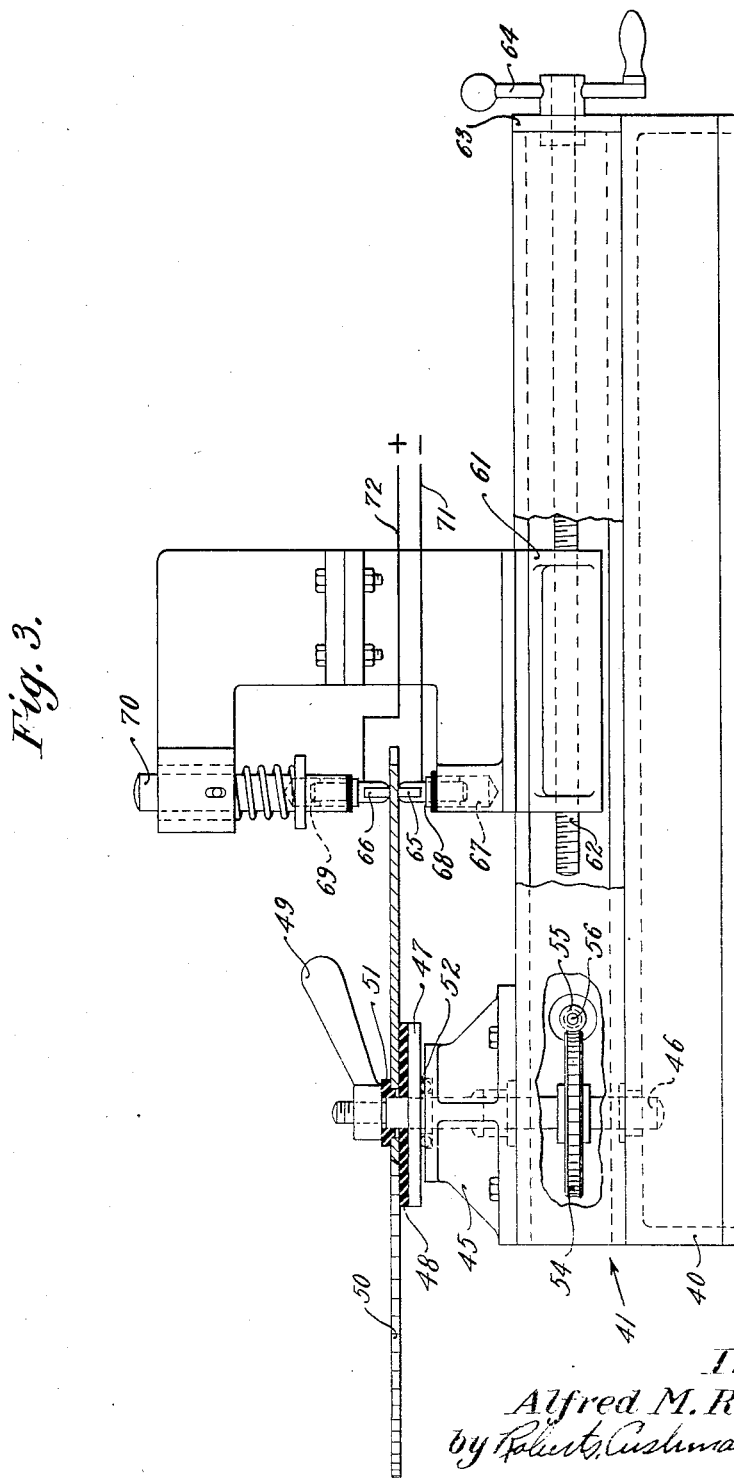

Patented June 11, 1935

2,004,174

UNITED STATES PATENT OFFICE 2,004,174

HEAT TREATMENT OF SAWS, ETC.

Alfred M. Remington, Fitchburg, Mass., assignor to Simonds Saw and Steel Company, Fitchburg, Mass., a corporation of Massachusetts Application December 30, 1931, Serial No. 583,819

3 Claims. (Cl. 219—11)

This invention relates particularly to saw tensioning and aims to provide a method and apparatus for uniformly heating an annular portion of a circular saw blade or the like, thereby to effect a uniform heat treatment of the same which will tension its periphery without injuring or substantially changing the character of the remaining portion of the blade so treated. A further object is to provide an apparatus which may be adjusted to accommodate saws of different sizes.

Heretofore it has been proposed to tension the periphery of circular saws by clamping the saw between annular heating units which contact with the saw throughout an annular area somewhat removed from the periphery of the saw, and subsequently cooling the saw in well known manner to have the periphery under tension circumferentially of the saw. This prior method has been unsatisfactory for various reasons, chiefly because different sized units had to be provided for saws of different diameters, the units were costly to make and keep in repair, the saws could not be observed while being heated, and it was difficult, if not impossible to produce uniform results in successive saws and sometimes throughout the circumference of individual saws.

In accordance with my invention I provide means for passing electric current through an annular portion of a saw blade adjacent to its periphery for a predetermined period of time, thereby heating the same to the required temperature to effect heat treatment which will result in tensioning the periphery of the blade. This is accomplished by producing relative annular movement, about the axis of the circular saw, between the saw and a pair of electrodes disposed on opposite sides of the saw, the electrodes being connected with a source of current by means of which a predetermined current is passed through the blade to heat the annular portion adjacent the path traced by the electrodes during said relative rotation.

As the heating effect depends primarily upon the strength of the current, the time, and the character of the saw blade, in order to produce the degree of heat necessary to tension the periphery of the blade it is proposed to regulate the speed of rotation of the blade for a definite current, or to regulate the current for a definite speed of rotation, or to regulate both speed and current concomitantly. Preliminary experiments may be necessary to determine these factors for a particular type of saw blade, but having once determined the relationships, thereafter it will be necessary merely to adjust the speed and current in accordance with the prior observations.

Apparatus for carrying out my method is shown in the accompanying drawings wherein Fig. 1 is a side elevation, partly in section and with parts broken away, of one type of saw tensioning apparatus;

Fig. 2 is a section on the line 2—2 of Fig. 1; and

Fig. 3 is a view similar to Fig. 1 of a modified type of apparatus.

Referring to the drawings, particularly Figs. 1 and 2, the apparatus shown therein comprises an elongated base 1 to which is rigidly secured the bed 2 and bracket 3. The bed preferably comprises a pair of channel irons 4 and 5 disposed in spaced relation, as shown in Fig. 2, to provide a longitudinal opening. A carriage 6 is slidably mounted on the inwardly directed flanged portions of the channel irons which serve as guides. The lower portion of the carriage projects into the opening and is provided with a longitudinally extending threaded opening which receives one end of screw shaft 8, the opposite end of the screw shaft being journaled in plate 9 secured to the end of the bed. By means of the hand crank 10 fast to the screw shaft, the position of the carriage, relative to the bracket 3, may be adjusted to accommodate saws of different diameters and to vary the location of the electrodes relative to the axis of each saw for the purpose of progressively varying the radius of the annular zone to be heated.

The upper part of the carriage is provided with a horizontal platform 12 having a facing 13 of suitable insulating material. A bolt or threaded pivot 14 projects upwardly from the central portion of the carriage and is firmly held in position by the set screw 15.

The bracket 3 preferably comprises a two-piece casting having its upper part rigidly secured to its lower part by bolts 16. A drive shaft 18 is journaled in the lower part of bracket 3 and the roller electrode 20 is keyed or otherwise suitably secured thereto. As shown in Fig. 1, the periphery of roller electrode 20 is tangent to the plane of the top surface of the insulating plate 13. The upper portion of the bracket is provided with an overhanging arm 19 having a vertically extending opening in which the rod 22 is slidably mounted. Integral with the lower end of rod 22 is a yoke 23 in which the roller electrode 21 is suitably journaled. Preferably the bearings in which each of the electrodes are journaled are provided with insulating sleeves or other suitable means providing insulation between the respective electrodes and the yoke and bracket. The coiled compression spring 25 circumposed about the rod 22 engages the arm 19 and yoke 23 and normally urges the electrode 21 downwardly toward the electrode 19, which is disposed in vertical alignment therewith. The vertical movement of electrode 21 is limited by the pin 26 which is carried by rod 22 and projects into the slots 27 of arm 19. Electrical conductors 30 and 31 connect the electrodes 20 and 21 respectively, with any suitable source of current, the electrode 21 preferably being connected to the positive terminal.

In operating the apparatus a saw 35 to be tensioned is positioned as shown in Fig. 1 with its opposite faces interposed between and in contact with the electrodes 20 and 21. The flanged insulating collar 32 fitting around the pivot 14 provides a suitable insulation between the saw and the pivot and also serves as a bearing for the saw. The annular flange of the collar is spaced from the plate 13 sufficiently to prevent binding the saw when the screw clamp 34 is tightened, thus permitting free rotation of the saw without objectionable play.

Thus the saw is rotated by the roller electrode 20 while current is passed through the annular zone adjacent the path traced on the saw by the electrodes. By using a heavy current the zone may be heated in one revolution, but I prefer to use a lighter current and rotate the saw many times, thereby gradually bringing the annular zone to the desired temperature. After the zone is heated it is cooled in the usual way to leave the periphery under tension.

The modification shown in Fig. 3 differs from that of Figs. 1 and 2 chiefly in that the saw is rotated independently of the electrodes, in which case the electrodes may be in the form of rollers or sliding shoes. In this embodiment the bed 41 comprises a pair of spaced channel irons which extend throughout the entire length of the base 40 and are rigidly secured thereto. The support 45, secured to the end of the bed, is provided with a vertically extending central opening in which the upper part of shaft 46 is journaled, the lower end of the shaft being journaled in the base 40. A turntable 47, keyed or otherwise fixed to shaft 46, is provided with a facing 48 of insulating material. The shaft 46 projects upwardly beyond the facing and is provided with a threaded end which receives the screw clamp 49 by means of which the saw 50 is firmly clamped between the flanged insulating collar 51 and the turntable. Preferably ball bearings 52 are provided between the turntable and the upper surface of the support. The worm wheel 54 fast to shaft 46 engages the worm 55 mounted on a driving shaft 56 journaled in the bed.

The bracket 60 is of similar construction to the corresponding member shown in Figs. 1 and 2, but is slidably mounted on the bed 41. The lower part of the bracket is provided with a depending portion 61 having a longitudinal threaded opening which receives the screw shaft 62. The outer end of the screw shaft is journaled in plate 63 secured to the end of the bed and is actuated by the hand crank 64 to adjust the longitudinal position of the bracket relative to the support 45.

In place of the roller electrodes shown in the previously described embodiment, shoe electrodes 65 and 66 have been substituted. The electrode 65 is mounted in recess 67 in the lower part of the bracket and is disposed with its contacting surface in the plane of the upper surface of the insulated facing 48 of the turntable. Preferably an insulating sleeve 68 is circumposed about the electrode 65 to insulate the same from the bracket. The electrode 66 is similarly mounted in recess 69 of the rod 70 and is disposed in vertical alignment with electrode 65. Electrical conductors 71 and 72 connect electrodes 65 and 66, respectively, with a suitable source of current.

It should be understood that the present disclosure is for the purpose of illustration only and that this invention includes all modifications and equivalents which fall within the scope of the appended claims.

I claim:

1. The method of tensioning a circular saw or the like which comprises progressively heating an annular portion of the article by passing current through said portion while shifting the path of the current circumferentially along said annular portion.

2. The method of heat treating an annular portion of a circular saw or like article, which comprises passing current through the portion, producing relative rotation between the path of the current and the article about the axis of the article, and continuing the rotation through a plurality of revolutions so that the annular portion is raised to a higher temperature during each revolution.

3. The method of heat treating a portion of an article which comprises heating the portion by passing current through the article and shifting the path of the current transversely of the path lengthwise of the portion a plurality of times so that the portion is raised to a higher temperature each time.

ALFRED M. REMINGTON.